United States Patent Office 2,863,772
Patented Dec. 9, 1958

2,863,772

CHOCOLATE PRODUCT AND PROCESS

Norman W. Kempf, Auburndale, Mass., assignor to General Foods Corporation, New York, N. Y., a corporation of Delaware No Drawing. Application April 9, 1956
Serial No. 576,806

14 Claims. (Cl. 99—23)

The present invention relates to heat resistant chocolate products and to the process for preparing the same.

Solidified chocolate, such as commonly used for coatings and other chocolate products, when subjected to temperatures above the melting point of the cocoa butter or other fat constituents, as in hot weather or in the tropics, tends to lose its desired character and shape, to become soft and unsatisfactory to handle, to exude its fat constituents at the surface, and to become sticky so that if wrapped, it sticks to the wrapper and its surface is marred when the wrapper is removed. These effects are particularly objectionable in chocolate coated confections, inasmuch as the chocolate coating constitutes an outer layer on an edible center and any tendency of the chocolate coating to flow or to adhere to the wrapper often results in an exposure of the center, not only rendering the confection unsightly, but also destroying its original identity as a chocolate coated confection.

In processing ordinary chocolate, it is conventional to grind a mixture of chocolate liquor and sugar to the desired degree of fineness using ordinary roll refiners and, thereafter, to incorporate the desired amount of cocoa butter. Milk solids may also be added, preferably prior to grinding. The chocolate mixture and cocoa butter is then placed in a conge, melangeur, or other suitable device capable of agitating or working the mixture and of providing aeration so that certain undesired aromas will be allowed to escape. Because of such working or continued agitation which may involve further grinding, the sugar and skim milk solids become completely coated with fat. This last step is commonly referred to as "finishing" and is necessary to the development of the finished chocolate flavor. The resulting mixture or "paste" is then tempered and either formed into a finished product or cast in the form of relatively large cakes which are stored for subsequent use or shipped to a confectioner for use in preparing solid or coated chocolate confections.

According to the usual commercial practice in making chocolate coatings, the large cakes as above described are prepared for casting into small bars or for the enrobing operation by remelting. After casting or enrobing, the chocolate sets to the solid state when cooled until the fat is crystallized, but reverts to its original soft, fluid condition when subsequently subjected to a temperature above the melting point of the fat.

In the production of heat resistant or shape-sustaining chocolate products, it has been proposed, in order to cope with the problem described above, to rely upon processing methods which provide for a reduced amount of working so as to leave a certain proportion of the surfaces of the sugar and skim milk particles naked of any fat film, the fat being melted and distributed only over sufficient of the particle surfaces to produce the degree of fluidity necessary for the operation which is to be performed. When such a mixture first sets, the mass becomes interspersed with a plurality of bonds between the contiguous bare faces of sugar particles, which bonds are formed through reaction with the moisture in the mass. This causes heavy internal friction so that the mass resists deformation even though the fat subsequently becomes melted at high temperatures. Thus, molded chocolate bars have been made which will remain set at summer or tropical temperatures. When subjected to these temperatures, some oiling off may take place, but the internal friction caused by the bonds between contiguous bare faces of the sugar particles is great enough to prevent the surface of the bar from being carried away when the wrapper is removed.

The disadvantages in the above described product reside in the fact that it does not have, as described hereinafter, a "finished" chocolate flavor and, moreover, such product cannot satisfactorily be used for the purpose of enrobing edible centers or otherwise. When a chocolate composition is to be used for enrobing, it must be more fluid than one intended for the preparation of solid bar confections as by extrusion into a mold. The plasticity of the mixture is directly proportional to the extent to which the particle surfaces of the ingredients other than fat are coated by melted fat. Consequently, when the mixing is carried to the point at which there will be sufficient fat coated particles to provide the necessary fluidity for the enrobing operation, there will not be enough fat-free surfaces left to build up internal friction when the fat is subsequently melted, and thereby to sustain the coating.

In order to provide sufficient fluidity to enable a chocolate product of the above type to be handled satisfactorily in an enrobing operation, it has been proposed to create a condition of temporary fluidity by the addition of a small amount of water to the basic composition before mixing, say of the order of 2–3%. When this product is ground on conventional roll refiners, as in the above-described process, some of this water is lost by evaporation, but sufficient remains to preserve a wet surface on some of the non-fat solid particles. Then, when this product is subsequently worked to break it down to paste consistency, the force of working creates unstable fat films on the surfaces of the water-wet particles, giving a temporary fluidity which lasts long enough to permit the desired enrobing with the chocolate. Because of the moisture beneath some of the fat films, however, the films break down subsequent to the enrobing operation, resulting in a "set" product which resists flow due to the bonds which are formed between the contiguous bare faces of the non-fat particles.

Although the improvement described above gives the necessary fluidity for enrobing candy centers and casting chocolate materials into bars, there are several attendant disadvantages. First, as in the preceding process, there has been no preparation of a finished flavor. In the case of finished chocolate products, the separate flavors of the ingredients are combined and certain undesirable aromas are removed as a result of the extended agitation and working. As a result, the consumer perceives only one flavor and not the separate flavors of the various ingredients, such as the cocoa beans, skim milk, sugar, etc. On the other hand, with the shape-sustaining chocolate products prepared in accordance with the two aforedescribed processes, it is impossible to provide a "finished" flavor since, in order to provide sufficient fat-free surfaces so that the product will retain its shape at temperatures above the melting point of the fat, the various ingredients cannot be mixed for a length of time sufficient to combine the flavors of the various ingredients and to remove the undesirable aromas. A second disadvantage of these two processes resides in the limited amount of fat that can be obtained in such a product, the amount of fat or cocoa butter being less than 35%. If this fat content is exceeded the described heat resistance is lost. A third disadvantage of the last described process is that in order to obtain the desired fluidity it is necessary to subject the chocolate material to special processing steps in the confectioner's plant. In using regular chocolate which has no heat resistant properties, the confectioner is simply required to melt the chocolate block supplied for coating purposes by raising the temperature of the same to 92°–110° F. However, in the case of the shape-sustaining chocolate containing the added 2–3% water, it is necessary that the confectioner employ special equipment or apparatus such as a melangeur in order to work the materials to a sufficient extent to obtain the desired fluidity. Moreover, although the fluidity is suitable for both molding and enrobing purposes, it is far from satisfactory and, once the chocolate material has been worked to a condition of temporary fluidity, it must be used immediately and not allowed to solidify. If it is not so used but allowed to solidify, the shape-sustaining properties will be lost upon subsequent reworking to provide the necessary fluidity.

A further improvement to the above-described processes has been to treat the heat resistant chocolate products after enrobing, casting or other final forming to prevent "oiling off" of the fat at the surface of the product when exposed to temperatures above the melting point of the fat. In such treatment moisture is applied to the surface of the heat resistant chocolate product while the chocolate coating or cast product is still in the hot plastic state. This results in some of the sugar in the mix dissolving in the moisture to form a sugar syrup film on the surface so that upon drying and cooling the film is solidified into a thin skin of crystalline sugar. This sugar skin effectively keeps the wrapper from contacting the underlying chocolate mass, and being derived from the coating itself the crystalline structure of the inner surface of this skin extends into the surface of the coating and interlocks closely with the microscopically rough surface of the bonds between the contiguous bare faces of the sugar particles. The firm interlocked relation of the sugar skin to the surface of the coating prevents the sugar skin from chipping off or becoming detached. Moreover, while some of the fat may melt under the skin, and some of it reach the surface, by exuding between crystalline interfaces of the sugar skin structure, the texture of the skin is such that the solid particles which cause stickiness are held back and do not reach the surface so that the coating does not adhere to the wrapper, with the result that there is no damage to the surface of the product when the wrapper is removed.

While the above-described process is effective in preventing oiling off resulting in the adherence of the coating to the wrapper, it provides insufficient shape retaining characteristics. Consequently, in order to provide a heat resistant product which will retain its shape or set at temperatures above the melting point of the fat, chocolate mixtures prepared according to the aforedescribed processes in which there are fat-free surfaces must be used in order to provide a chocolate product which is acceptable during the heat of the summer or at all times in the tropics. However, as evident from the foregoing, all of such chocolate products as will retain their shape or set at elevated temperatures have been unacceptable in that they do not have a "finished" chocolate flavor, cannot be used for enrobing edible centers, or require the use of special equipment by the confectioner and cannot be reworked after having once been allowed to set. It is easily seen, therefore, that the provision for an edible chocolate product which will not lose its set when exposed to temperatures above the melting point of the fat and which is free from the aforedescribed disadvantages is highly desirable.

It is an object of the present invention to provide edible chocolate products having the characteristic "finished" chocolate flavor and capable of retaining their shape and character at elevated temperatures.

Another object of the invention is to provide chocolate goods which can be used by the confectioner in the preparation of heat resistant chocolate and chocolate coated products without requiring the use of special processing equipment.

A further object of the invention is to provide chocolate goods which can be softened or melted in the conventional way and formed into chocolate and chocolate coated products capable of retaining their shape and character at elevated temperatures.

Still further objects of the present invention will become apparent from the description that follows hereinafter.

It has now been found that a heat resistant chocolate having a completely blended or finished chocolate flavor can be produced by incorporating into the chocolate, milk protein such as casein and lactalbumen and sucrose plated or coated with moisture and invertase. Invertase inverts at least some of the sucrose in the chocolate and provides it with a coating of invert sugar which is a very effective humectant. The invert sugar causes the chocolate to absorb moisture from the atmosphere and results in the formation of a structure which renders the chocolate product self-sustaining at temperatures above the melting point of cocoa butter. It is believed that the moisture so absorbed goes to the milk protein with the result that the non-fat milk solids become swollen and at least partially interbonded to provide a structure within the chocolate or chocolate product and render it heat resistant.

The protein may be added in any manner but is conveniently incorporated by adding milk solids. Preferably, the milk solids incorporated into the chocolate should result in the addition of skim milk solids equal in weight to 2–20% by weight of the chocolate composition.

The invertase is generally incorporated into the chocolate by being plated or coated on the sucrose used in the chocolate manufacture. This is done by spraying or otherwise distributing the enzyme in aqueous solution over the surface of the sugar. Thereafter, the bulk of the water used to dissolve the enzyme is evaporated. Some of this water, however, must usually be retained if the interaction between the enzyme and the sucrose is to occur since water is needed to start the inversion of the sucrose which is a hydrolysis reaction requiring a molecule of water for every molecule of sucrose inverted. If needed, additional water is probably supplied to the system by the humectant action of the invert sugar which also, of course, supplies the moisture to the milk protein needed for the desired interbonding. It has been found that, to provide best results, the amount of moisture which should be on the sugar plated with invertase is within the range of about 2–5% of the weight of the sugar.

The desired moisture content on the basis of the finished chocolate is not less than about 0.4% nor more than about 2.5% of the weight of chocolate. This range takes into account the fact that appreciable quantities of moisture may in some cases be incorporated into the chocolate by virtue of a relatively high moisture content of the dry milk solids, or in some cases, the milk crumb. This moisture content, however, is not effective for the desired inversion nor is it effective to cause the desired interbonding, apparently being held for the most part by the milk sugar.

It is also possible to incorporate the enzyme by plating it on the milk solids to be incorporated into the chocolate where said milk solids have already been admixed with a substantial proportion of the sucrose to be incorporated into the product. In this case, of course, the enzyme is coated to whatever extent possible on the sucrose itself. Where the enzyme is only in contact with the milk solids and not with any sucrose no beneficial action will occur. Resort must be had to this technique, however, where all of the sugar and milk solids to be employed in making the chocolate are in intimate admixture as a result of having been dried together as in the production of so-called "milk crumb." Wherever possible, however, it is much preferred that the invertase be plated on the sucrose by itself and not in combination with anything else which would dilute the effect of the enzyme by covering the surface of the sucrose or otherwise preventing intimate contact between the enzyme and the sugar.

The amount of enzyme to be employed depends in some measure, of course, upon its activity. Generally, commercially available enzyme preparations have an activity of the order of 0.26 American Organization of Analytical Chemists. With such preparations the amount of enzyme employed per 100 lbs. of sugar may range from as little as 1 oz. to as high as 1 lb. Higher amounts can be used, of course, but this is wasteful of the expensive enzyme preparation. Amounts appreciably less than 1 oz. of enzyme preparation can be employed but here again practical considerations oppose the use of such small amounts in that the desired heat resistance is slow in developing. Generally, it is preferred to use about 2–8 oz. of invertase/100 lbs. of sucrose, this range providing a practical degree of heat resistance in the chocolate within a reasonable period of time and efficient use of enzyme.

The advantage of using invertase instead of attempting to incorporate invert sugar or other humectants as such into the chocolate involves the fact that the moisture absorption which results in the desired interbonding must not occur until after final shaping and not, at least to any substantial degree, before such shaping. When invert sugar or other humectants are incorporated directly into the chocolate careful control of the humidity conditions during the various stages of manufacture, shipment and storage must be maintained. This is particularly true in manufacture and especially in the grinding or refining step where the chocolate is distributed on the grinding rolls in thin layers exposing a relatively high proportion of surface area. Such humidity control is, of course, expensive. The use of invertase in accordance with the present invention eliminate all need for such humidity control because it is possible to control the action of the enzyme so that no humectant action occurs until after final shaping. This is done by controlling the amount of invertase and moisture plated on the sucrose at the time of their incorporation into the chocolate. Generally, where the amount of invertase employed is about 2 oz. per 100 lbs. of sugar, it has been found that at a moisture level of about 5% of the weight of the sugar the inversion necessary for the humectant action which provides heat resistance in the chocolate product occurs in a week, whereas at levels as low as 2% moisture a period of the order of one month is required. Even longer periods are required when the moisture level is, say 1% or ½% and, of course, at very low levels the benefits of the invention are not had for all practical purposes. The amount of invertase is less critical but the use of more enzyme will reduce the period needed for substantial inversion, also. But, this approach is more expensive, of course.

The action of the invertase having progressed to a substantial degree by the time the chocolate has been used in the fabrication of the final product, the goods are then exposed to humidity conditions to bring about the desired moisture absorption and render the chocolate piece, chocolate coating or other chocolate product heat resistant. Exposure of the final shaped chocolate product to humidity conditions such as 50–70% R. H. provides sufficient moisture absorption within a period of 2–4 weeks to create the desired structure. This, of course, can take place during normal distribution of the finished confection through commercial channels so that a finished, heat resistant chocolate product is secured with virtually a minimum of additional expense from the standpoint of additional materials and/or labor costs.

However, in order to insure that the customer obtains satisfactory heat resistance regardless of when he receives the products or the type of humidity conditions to which it has been exposed prior to receipt by him, it has been found preferable to expose the shaped chocolate product to controlled high humidity prior to shipment to the customer, for example, at a relative humidity of about 88% at about 84° F. for about 4–24 hours. If the goods are to be shipped to a dry, hot area, the 24 hour treatment would be used, if to a humid, hot area, the 4 hour treatment, and if shipped in spring or early summer no treatment would be needed.

A typical example employing the process of the present invention follows:

*Example*

A 100 lb. batch of sweetened milk chocolate is produced by placing 42½ lbs. of sucrose in a melangeur heated to 120° F. and spraying onto the sugar a solution of 4 oz. of invertase dissolved in 50 oz. of water, said intervase having an activity of about 0.26 (AOAC). The operation of the melangeur is continued for another 10 minutes to evaporate some of the water, leaving the moisture content of the sucrose within the range of about 2–5%. The sucrose carrying the enzyme and the water is then combined with 10 lbs. of chocolate liquor, 18 lbs. of whole milk solids, 10 lbs. of cocoa butter, 4½ lbs. of corn syrup solids (24 DE), mixed together and ground on a roll refiner for the purpose of reducing the particle size. Thereafter, an additional 15 lbs. of cocoa butter is added to the ground material and the entire amount is worked on a conge at 124° F. for 24 hours until substantially all of the solid particles are encased in melted fat.

The chocolate is tempered and may be used in conventional enrobing or depositing machines to coat candy centers or prepare candy bars, respectively. On the other hand, it may be cast into a large block, e. g., a 10-lb. block, which can be shipped to a confectioner for the purpose of enrobing candy centers or molding solid chocolate bars. Upon arrival at the confectioner's plant it is employed for either of these purposes by being melted at a temperature of 90°–100° F. and after final shaping, it is solidified by cooling, tempered and the final product packaged and otherwise handled in the usual manner.

It is from this point on, of course, that the desired action of the invert sugar takes place. Moisture-proof packaging materials, of course, are not employed since this would defeat the purpose of employing the humectant. Generally, after the chocolate products containing invert sugar have been subjected to average humidity conditions for a period of 2–4 weeks in the course of normal distribution, it is found that sufficient moisture absorption has occurred to create the structure giving rise to the desired heat resistance. Fortunately, during the hotter part of the year humidities are relatively high thereby lessening the period required for moisture absorption and the creation of the desired structure. On the other hand, especially where the chocolate products are designed to be sold in relatively hot, dry areas, it may be desirable to store the chocolate products under conditions of high humidity, say, about 80%, at a temperature below the melting point of the chocolate, say 84° F., for 2–24 hours to make sure that the desired structure obtains.

It is to be understood that the scope of the invention is not intended to be limited to the specific procedures, proportions of ingredients, and other particulars which have been set forth above, which have been given by way of illustrating the principle of the invention. For

What is claimed is:

1. A process of making a heat resistant chocolate which is self-sustaining at temperatures above the melting point of cocoa butter, comprising incorporating milk protein and sucrose coated with moisture and invertase into the chocolate, shaping the final chocolate product and then exposing said final shaped chocolate product to a humid atmosphere.

2. The process of claim 1 in which the moisture content carried by the sucrose at the time of its incorporation into the chocolate is within the range of about 2–5%.

3. The process of claim 1, wherein 2–8 oz. of invertase is employed for each 100 lbs. of the sucrose, said invertase having an activity of about 0.26 (American Organization of Analytical Chemists).

4. The process of claim 1 in which the milk protein is employed in an amount equal to about 2–20% of the weight of the chocolate expressed as skim milk solids.

5. A process of making a heat resistant chocolate which is self-sustaining at temperatures above the melting point of the cocoa butter, comprising exposing the finally shaped chocolate containing milk protein and sucrose coated with moisture and invertase to a humid atmosphere of 50–88% relative humidity for two hours to 4 weeks.

6. The process of making a heat resistant chocolate which is self-sustaining at temperatures above the melting point of cocoa butter in which chocolate containing milk protein and sucrose coated with moisture and invertase is given its final shaping and then exposed to a humid atmosphere of 88% relative humidity for two hours.

7. A process of making a heat resistant chocolate which is self-sustaining at temperatures above the melting point of cocoa butter, comprising incorporating milk protein and sucrose coated with moisture and invertase to the chocolate prior to final shaping of the chocolate.

8. The process of claim 7 in which the moisture content carried by the sucrose at the time of its incorporation into the chocolate is within the range of 2–5%.

9. The process of claim 7, wherein 2–8 oz. of invertase is employed for each 100 lbs. of the sucrose, said invertase having an activity of about 0.26 (American Organization of Analytical Chemists).

10. The process of claim 7 in which the milk protein is employed in an amount equal to about 2–20% of the weight of the chocolate expressed as skim milk solids.

11. A chocolate product in which the non-fat constituents are dispersed in a continuous phase of the fat constituents, characterized by having incorporated therein milk protein and sucrose coated with moisture and invertase whereby invert sugar will be produced and cause the absorption of moisture by the chocolate product to render the same self-sustaining at temperatures above the melting point of cocoa butter.

12. The product of claim 11 in which the moisture content of the chocolate is within the range of about 0.4–2.5%.

13. The product of claim 11 in which the milk protein is contained in the chocolate product in an amount equal to about 2–20% of the weight of said product expressed as skim milk solids.

14. The product of claim 11 in which the amount of invertase coated on the sucrose is equivalent to invertase having an activity of about 0.26 (American Organization of Analytical Chemists) and employed at a level of about 2–8 oz. of invertase/100 lbs. of the sucrose.

References Cited in the file of this patent

UNITED STATES PATENTS 1,437,816     Paine et al.   --------------   Dec. 5, 1922

OTHER REFERENCES

"The Chemistry, Flavouring and Manufacture of Chocolate Confectionery and Cocoa," by H. R. Jensen, pub. 1931 by J. & A. Churchill, London, Great Britain, pages 240, 247, 248.